(12) United States Patent
Syed et al.

(10) Patent No.: US 11,494,488 B2
(45) Date of Patent: Nov. 8, 2022

(54) SECURITY INCIDENT AND EVENT MANAGEMENT USE CASE SELECTION

(71) Applicant: International Business Machines Corporation, Armonk, NY (US)

(72) Inventors: Tousif Ahmed Syed, Dubai (AE); Tamer Aboualy, Etobicoke (CA); Dusty Boshoff, Extension (CA)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/070,058

(22) Filed: Oct. 14, 2020

(65) Prior Publication Data
US 2022/0114252 A1    Apr. 14, 2022

(51) Int. Cl.
*G06F 21/55* (2013.01)
*G06F 21/62* (2013.01)

(52) U.S. Cl.
CPC .......... *G06F 21/554* (2013.01); *G06F 21/62* (2013.01); *G06F 2221/034* (2013.01)

(58) Field of Classification Search
CPC ..... G06F 21/50–577; G06F 21/60–645; G06F 2221/034
See application file for complete search history.

(56) References Cited

U.S. PATENT DOCUMENTS

| | | | |
|---|---|---|---|
| 8,782,784 B1 | 7/2014 | Bruskin | |
| 9,256,761 B1* | 2/2016 | Sahu | G06F 16/21 |
| 9,503,472 B2 | 11/2016 | Laidlaw et al. | |
| 9,507,944 B2 | 11/2016 | Lotem et al. | |
| 10,382,486 B2 | 8/2019 | Rivers | |
| 10,673,891 B2* | 6/2020 | Lee | H04L 63/1416 |
| 11,265,338 B2* | 3/2022 | Murphy | H04L 63/20 |
| 2013/0124449 A1* | 5/2013 | Pinckney | G06N 20/00 706/52 |
| 2015/0033340 A1 | 1/2015 | Giokas | |
| 2017/0034023 A1* | 2/2017 | Nickolov | H04L 43/0817 |
| 2017/0316203 A1* | 11/2017 | Reybok | H04L 63/145 |
| 2019/0065755 A1 | 2/2019 | Hatsutori et al. | |
| 2021/0182388 A1* | 6/2021 | Myneni | G06N 20/00 |

FOREIGN PATENT DOCUMENTS

JP    2007164465 A    *    6/2007

* cited by examiner

*Primary Examiner* — Madhuri R Herzog
(74) *Attorney, Agent, or Firm* — Rachel M. Yadlosky

(57) ABSTRACT

A method, system, and computer program product for adaptive network provisioning. The method may include storing a plurality of use case records in a use case repository, where each use case record provides a diagnostic definition of a security threat to a SIEM environment. The method may also include storing metadata for a plurality of attributes of subscribers to the SIEM environment. The method may also include storing use cases that the subscribers have deployed from the use case repository. The method may also include setting up a new subscriber, where setting up the new subscriber includes: receiving a set of attributes of the new subscriber; searching a metadata store to identify subscribers with attributes that are similar to the set of attributes; and selecting an initial set of use cases for the new subscriber based on use cases deployed by the identified subscribers.

18 Claims, 9 Drawing Sheets

SECURITY INCIDENT AND EVENT MANAGEMENT USE CASE SELECTION

BACKGROUND

The present disclosure relates to Security Incident and Event Management (SIEM) and more specifically to identification of relevant use cases in a use case library.

In some embodiments, enterprise security is a complex problem requiring the coordination across security policies, controls, threat models and threat detection scenarios (use cases). The implementation of these policies, models and controls requires extensive use of threat monitoring technologies and security devices, as well as human resources that have security, business and technical skills (i.e., security analysts with administrator rights). In particular, the ever-increasing number of threats at scale requires automation in support of security analysts, who are responsible for preventing, detecting, and responding to these threats. In most cases, the security analyst must manually search through a wide range of data sources (some private, many public), review past threat events and how they were handled, check for duplicate events, currently open similar events and a knowledge database, and so forth, to determine an appropriate response procedure to handle this information. This process of data collection, analysis, and determining the final disposition of the alert is time consuming and tedious for the security analysts.

A SIEM platform may combine security information management (SIM) and security event management (SEM). SIEM services provide threat monitoring combined with threat analysis of security alerts in a computer environment such as a network (e.g., by a software application, by an operating system, or by hardware). SIEMs can be used to detect situations such as login source repeat attacks (e.g., brute force password guessing), firewall attacks (e.g., scans, worms), network attacks (e.g., scans, worms), virus detection, and malware detection. A SIEM platform may aggregate security data (e.g., logs, events etc.) from disparate systems in the environment and provides intelligent outputs that can be used for decision making and actions against threats. A SIEM platform thus provides a platform for security analysts to identify and process threats. The SIEM platform helps a team of security analysts to accurately detect and prioritize threats across an enterprise. It provides intelligent insights that enable the security team to respond quickly and reduce the impact of incidents.

A SIEM platform operates through "use cases." A use case is effectively a definition of a particular known security threat, which can therefore be referred to in order to identify such an incident. A use case may be embodied in a record of a database. The use case record may include a set of rules defining a threat which can be screened against events to establish if they represent a threat as defined by that use case. An example of a use case is "Anomalous Privilege Escalation," which detects if a user is changing or escalating his or her own privileges for a critical system. Another example might be when a device is inserted into a USB port of a computer which is in the client environment. A set of use cases relevant to a particular environment can be generated over time by the security team based on historical events. However, to reduce the workload and time delay of bespoke creation of a suitable set of use cases, the vendor can supply subscribers with a data repository (i.e., library) of pre-configured use cases. The use cases that are relevant to any particular environment may be a subset of the use cases stored in the library.

SUMMARY

The present invention provides a computer-implemented method, system, and computer program product for adaptive network provisioning. The method may include storing a plurality of use case records in a use case repository, where each use case record provides a diagnostic definition of a security threat to a SIEM environment. The method may also include storing metadata for a plurality of attributes of subscribers to the SIEM environment. The method may also include storing use cases that the subscribers have deployed from the use case repository. The method may also include setting up a new subscriber, where setting up the new subscriber includes: receiving a set of attributes of the new subscriber; searching a metadata store to identify subscribers with attributes that are similar to the set of attributes; and selecting an initial set of use cases for the new subscriber based on use cases deployed by the identified subscribers.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
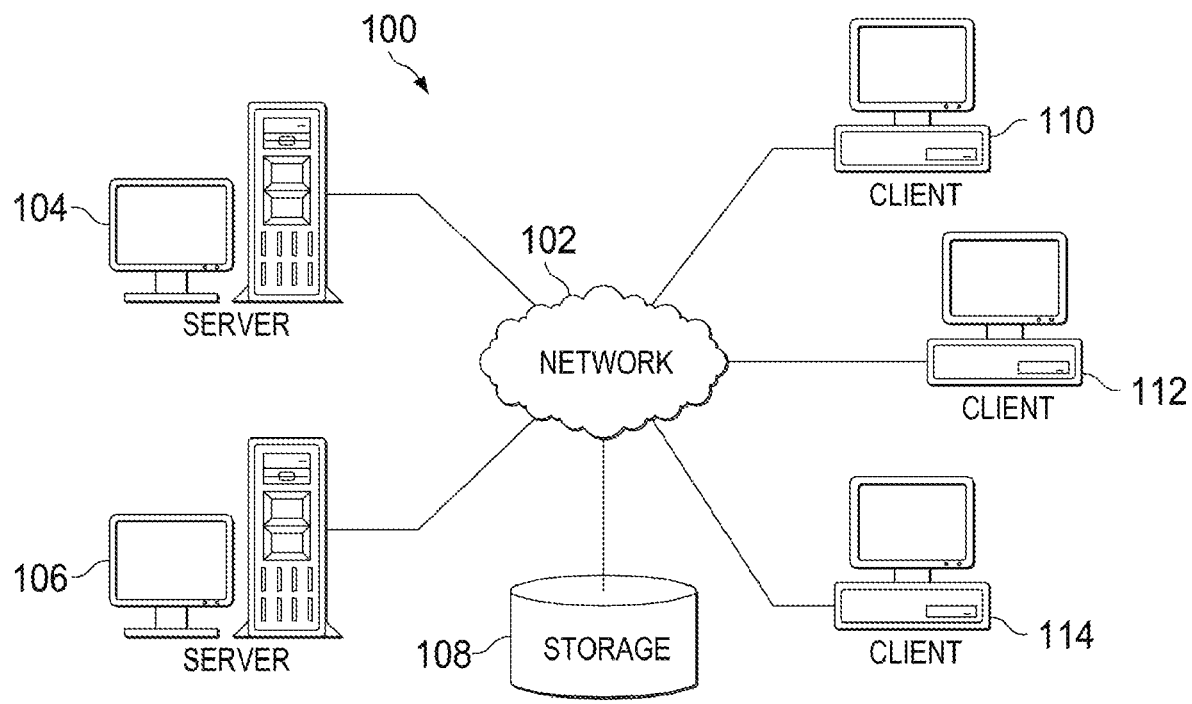
FIG. 1 depicts an exemplary block diagram of a distributed data processing environment in which exemplary aspects of the illustrative embodiments may be implemented, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Aspects of the present disclosure relate to Security Incident and Event Management (SIEM) and more specifically to identification of relevant use cases in a use case library. While the present disclosure is not necessarily limited to such applications, various aspects of the disclosure may be appreciated through a discussion of various examples using this context.

In some instances, selections are made with an automated procedure based on deemed relevance to the subscriber environment and the observed threat context. A computer-automated method may search a set of use cases provided in a library to make a selection of a subset of the use cases which will be relevant to a particular environment. The selected subset of use cases may be sent to the SIEM console of the subscriber's SIEM environment. The security team can then use the SIEM console to make decisions on which of these use cases are approved for deployment in the subscriber's SIEM environment. The automated searching of and selection from the library to find use cases that are relevant to a specific environment can significantly reduce the amount of time that a security team would otherwise need to find and select relevant use cases.

According to an aspect of the disclosure, there is provided a computer apparatus for a SIEM system, the computer apparatus comprising: a use case repository configured to store a plurality of use case records, each providing a diagnostic definition of a security threat to a SIEM environment; a metadata store configured to store metadata for a plurality of attributes of subscribers to the SIEM system as well as which use cases the subscribers have deployed from the use case repository; and an initial configuration module operable to set up a new subscriber by: receiving the attributes of the new subscriber; searching the metadata store to identify subscribers with common attributes (e.g., attributes that are sufficiently similar); and selecting an initial set of use cases for the new subscriber based on the use cases deployed by other subscribers with common attributes.

According to another aspect of the disclosure there is provided a computer-automated method for SIEM, the method comprising: providing a use case repository configured to store a plurality of use case records, each providing a diagnostic definition of a security threat to a SIEM environment; providing a metadata store configured to store metadata for a plurality of attributes of subscribers to the SIEM system as well as which use cases the subscribers have deployed from the use case repository; and setting up a new subscriber in an initial configuration module by: receiving the attributes of the new subscriber; searching the metadata store to identify subscribers with common attributes; and selecting an initial set of use cases for the new subscriber based on the use cases deployed by other subscribers with common attributes.

In certain embodiments, the initial configuration module is configured to supply the initial set of use cases to a SIEM management user interface for the new subscriber, the SIEM management user interface comprising user controls configured to allow a system administrator to approve and reject the use cases for deployment in the new subscriber's SIEM environment. In certain embodiments, the initial configuration module is configured to deploy the initial set of use cases in the subscriber SIEM environment. In certain embodiments, the initial configuration module comprises a page ranking algorithm for searching the metadata store to identify the subscribers with common attributes.

There may additionally be provided a subscriber use case store configured to store respective subscriber containers, each storing at least the use cases deployed by that subscriber. The subscriber containers may also include a log of use case history including which use cases have been offered for deployment and rejected.

In certain embodiments, an ongoing configuration module may be provided for existing subscribers which comprises a machine learning algorithm configured to select on demand an updated set of use cases for a particular existing subscriber by: computing respective similarity values of a similarity metric between pairs of existing subscribers including the particular existing subscriber and other ones of the existing subscribers, the similarity metric being based on which use cases are common to the pair of subscribers; and selecting an updated set of use cases for the particular subscriber based on the use cases deployed by other subscribers with similarity values above a threshold.

The ongoing configuration module may be configured to supply the updated set of use cases to a SIEM management user interface for the particular existing subscriber, the SIEM management user interface comprising user controls configured to allow a system administrator to approve and reject the use cases for deployment in the existing subscriber's SIEM environment. The ongoing configuration module may be configured to deploy the updated set of use cases in the subscriber SIEM environment. A cosine similarity algorithm may for example be used to compute the similarity values between pairs of existing subscribers.

According to a further aspect of the disclosure, there is provided a computer program stored on a computer readable medium and loadable into the internal memory of a computer system, comprising software code portions, when said program is run on a computer system, for performing the above method. A computer program product may also be provided that stores the computer program.

FIG. 1 depicts an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like.

Figure 2:
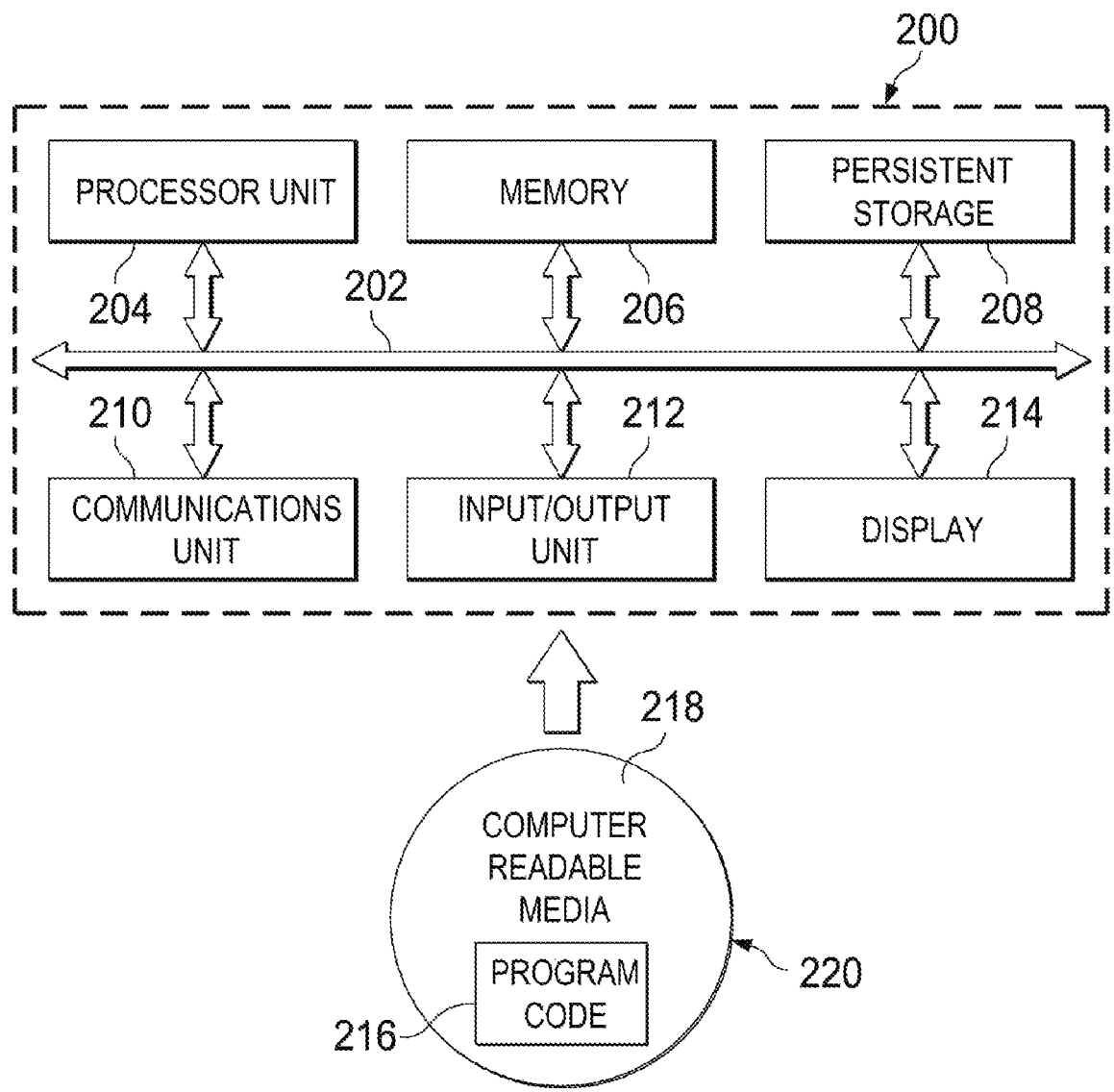
FIG. 2 depicts an exemplary block diagram of a data processing system in which exemplary aspects of the illustrative embodiments may be implemented, according to some embodiments.

FIG. 2 is a block diagram of an exemplary data processing system 200 in which aspects of the illustrative embodiments may be implemented. In some embodiments, Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212 and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random-access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus.

Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Those of ordinary skill in the art will appreciate that the hardware in FIGS. 1 & 2 may vary depending on the implementation. Other internal hardware or peripheral devices, such as flash memory, equivalent non-volatile memory, or optical disk drives and the like, may be used in addition to or in place of the hardware depicted in FIGS. 1 & 2. Also, the processes of the illustrative embodiments may be applied to a multiprocessor data processing system, other than the SMP system mentioned previously.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for hypertext transfer protocol (HTTP), simple object access protocol (SOAP), extensible markup language (XML), web service definition language (WSDL), universal description, discovery, and integration (UDDI), and web services flow language (WSFL), among others.

Figure 3:
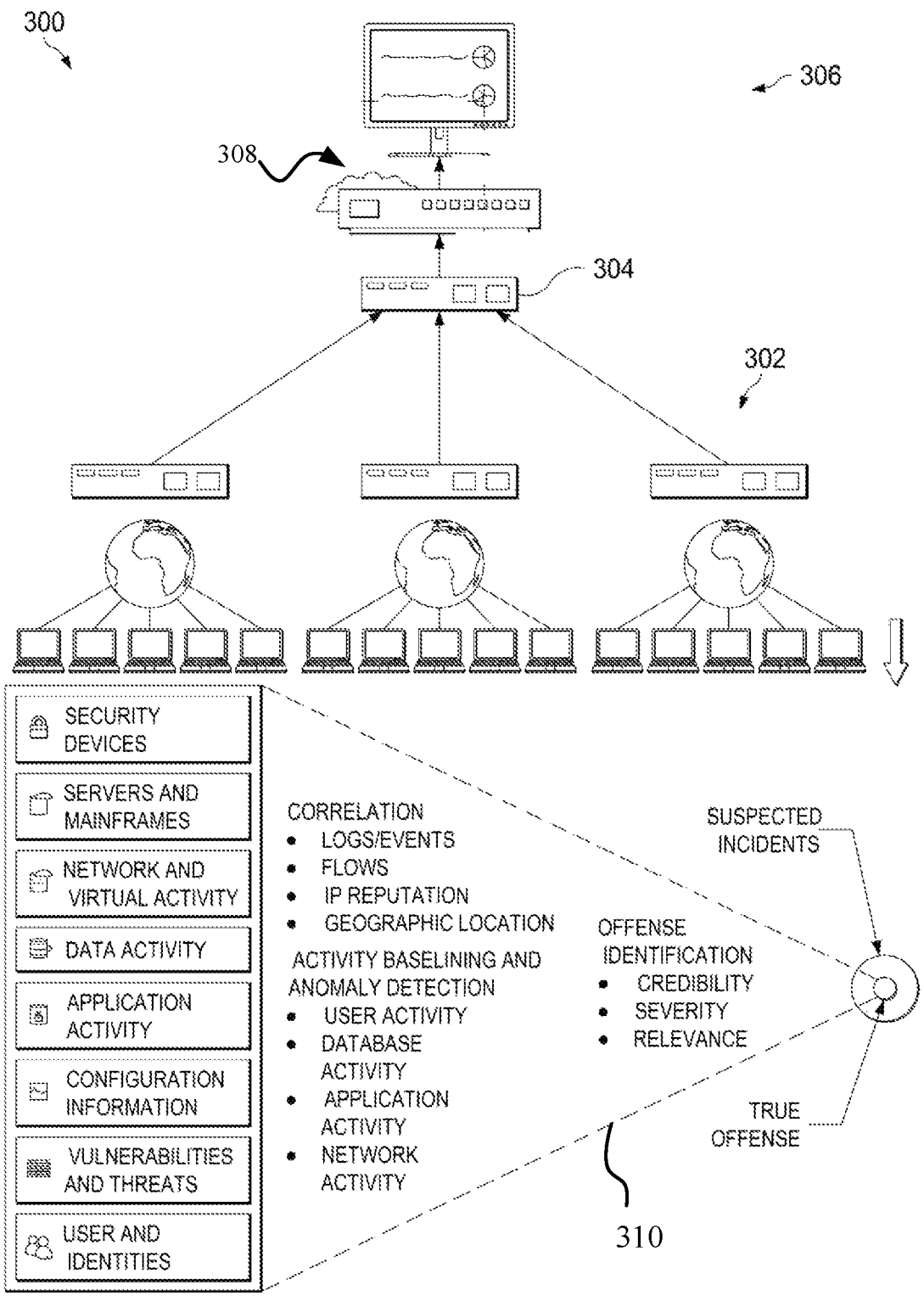
FIG. 3 depicts a security intelligence platform in which the techniques of this disclosure may be practiced, according to some embodiments.

FIG. 3 depicts a type of SIEM platform 300. Generally, the platform 300 may provide search-driven data exploration, session reconstruction, and forensics intelligence to assist security incident investigations. In some embodiments, the platform 300 comprises a set of packet capture appliances 302, an incident forensics module appliance 304, a distributed database 306 (with SIEM console 308, packet capture appliances 302, and module appliances 304), and a SIEM console 308. The packet capture appliances 302 and module appliances 304 may be configured as network appliances, virtual appliances, etc. The packet capture appliances 302 may capture packets off the network (for example, using known packet capture (pcap) application programming interfaces (APIs), or other known techniques). The packet capture appliances may provide such data (e.g., real-time log event and network flow) to the distributed database 306, where the data is stored and available for analysis by the forensics module 304 and the SIEM console 308. A packet capture appliance may operate in a session-oriented manner, capturing all packets in a flow, and indexing metadata and payloads to enable fast search-driven data exploration. The database 306 provides a forensics repository, in which distributed and heterogeneous data sets comprising the information collected by the packet capture appliances are stored. The SIEM console 308 may provide a web- or cloud-accessible user interface (UI) that exposes a "Forensics" dashboard tab to facilitate an incident investigation workflow by an investigator, such as an analyst who is assigned to a security operation center (SOC). Using the dashboard, the analyst may select a security incident. The incident forensics module 304 retrieves all the packets (including metadata, payloads, etc.) for a selected security incident and reconstructs the session for analysis.

In particular, a typical incident forensics investigation to extract relevant data from network traffic and documents in the forensic repository is now described. According to this approach, the platform 300 may enable a simple, high-level approach of searching and bookmarking many records at first, and then may enable the analyst to focus on the bookmarked records to identify a final set of records. In a typical workflow, an analyst determines which material is relevant. They may then use that material to prove a hypothesis or "use case" to develop new leads that can be followed up using other methods in an existing use case. Typically, the analyst may focus their investigation on course-grained actions at first, and then proceed to fine-tune those findings into a relevant final result set. The bottom portion of FIG. 3, labelled 310, illustrates this basic workflow. Visualization and analysis tools in the platform may then be used to assess the results for relevance. The relevant records can be printed, exported, or submitted for processing.

As noted above, the platform's SIEM console 308 provides a user interface to facilitate this workflow. Thus, for example, the platform 300 may provide a search results page as a default page on an interface display tab. Analysts may use the search results to search for and access documents. The analyst can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents may be automatically tagged. The forensics incident module 304 may correlate tagged identifiers that interacted with each other to produce a digital impression. The collection relationships in a digital impression report may represent a continuously collected electronic presence that is associated with an attacker, or a network-related entity, or any digital impression metadata term. Using the tool, analysts can click any tagged digital impression identifier that is associated with a document. The resulting digital impression report is then listed in tabular format and is organized by identifier type.

In some embodiments, a digital impression reconstructs network relationships to help the analyst identify an attacking entity and other entities that it communicates with. A security intelligence platform may include a forensics incident module that is operative to correlate tagged identifiers that interacted with each other to produce a digital impression. The collection relationships in a digital impression report may represent a continuously collected electronic presence that is associated with an attacker, or a network-related entity, or any digital impression metadata term. Using the tool, analysts can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service-oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor may provide a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment. In some instances, the box may be positioned locally and then provisioned with standard or customized middleware virtual images that can be securely deployed and managed (e.g., within a private or an on-premise cloud computing environment). The appliance may include hardware and firmware cryptographic support (for example, possibly to encrypt data on hard disk). In some embodiments, no users, including administrative users, can access any data on physical disk. In particular, operating systems (e.g., Linux) may lock down the root account and may not provide a command shell, therefore the user may not have file system access. In some embodiments, the appliance does not include a display device, a CD or other optical drive, or any USB, Firewire, or other ports to enable devices to be connected thereto. The appliance may be designed to be a sealed and secure environment with limited accessibility (for instance, by only authenticated and authorized individuals).

In some embodiments, Security Information and Event Management (SIEM) tools provide a range of services for analyzing, managing, monitoring, and reporting on IT security events and vulnerabilities. Such services may include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology, and vulnerability exposures. Some SIEM tools may have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, may be network- and network-configuration based.

Figure 4:
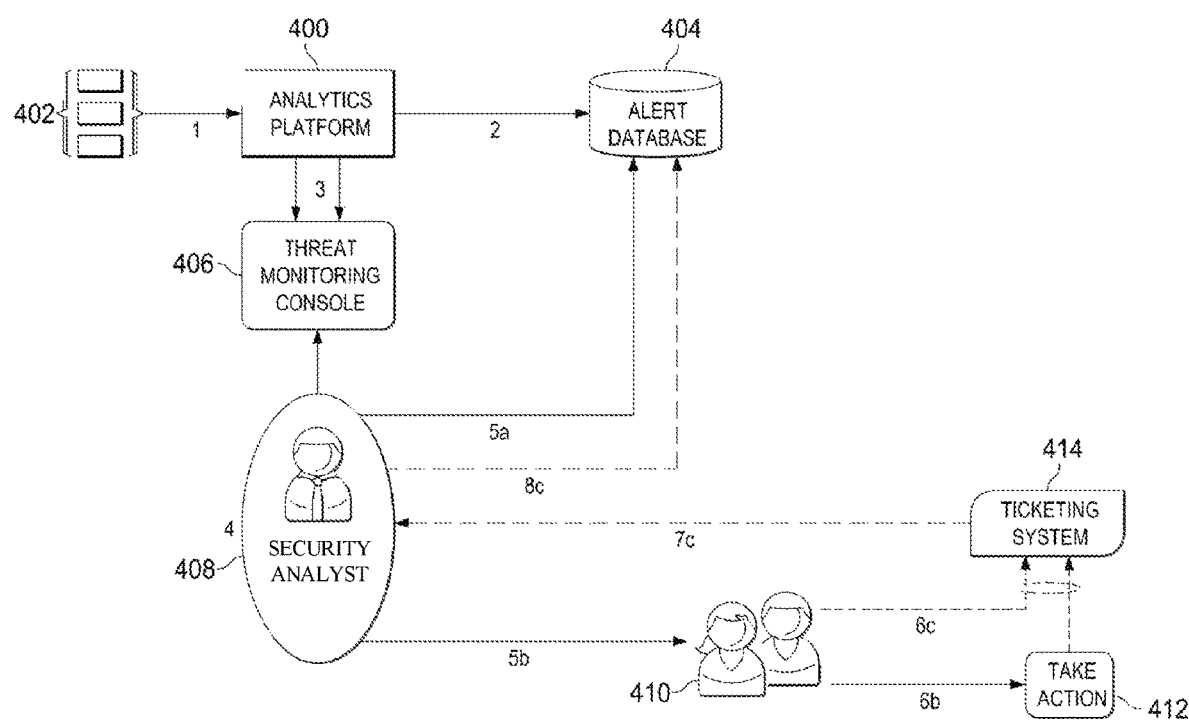
FIG. 4 depicts a Level 1 security threat monitoring operation in a data center operating environment, according to some embodiments.

FIG. 4 depicts a SOC that provides Level 1 security threat monitoring using an analytics platform 400. The platform 400 receives alerts (at step 1) from a variety of log sources 402, such as firewalls, intrusion detection and prevention systems, antivirus systems, web proxies, and other systems and network devices. At step 2, the alerts are stored in an alert database 404. At step 3, the alerts are provided to threat monitoring console 406 (e.g., a SIEM console) that is manned by a security analyst 408 from the security team. A SOC may be manned by different levels of security analysts. A Level 1 (L1) analyst may be responsible for monitoring reported security events, and for closing or escalating those events according to SOC rules, policies and procedures. The security analyst 408 interacts with a client 410. This may be beneficial, for example, if the enterprise entity has an application that is being monitored for security threats. Although not shown, the SOC may have one or more additional levels of security analysts 408, such Level 2 (L2) and Level 3 (L3) analysts. In some instances, L2 security analysts may handle escalations from L1 analysts and perform other administration and management functions, such as monitoring the performance of the L1 analysts to ensure that security events are handled timely, mentoring, and the like. Level 3 analysts may handle further escalations (from L2 analysts), and provide additional higher-level administration and management functions in the SOC. The number of levels and the various tasks associated with each level may be varied and implementation specific.

As depicted, the L1 analyst 408 makes a finding regarding an alert, typically with a goal of making this finding within about 15-20 minutes after receiving the alert. The finding may close the alert (step 5a) as a false positive or may escalate the alert (step 5b) as a possible attack. The false positive finding is stored in the alert database 404. If the alert is escalated (step 5b), the attack finding may be reported to the client 410 whose application is affected. Depending on the implementation (e.g., the SOC policy, the client procedure, etc.), some remediation or other action (step 6b) is taken. In some instances, the client 410 may indicate that the alert is a false positive and thus should be closed (step 6c). The responsive action 412 may be carried out in an automated manner (e.g., programmatically), manually, or by a combination of automation and manual operations. The action may be carried out by SOC personnel, by the client, or by a combination of SOC personnel and the client. As also depicted, information regarding the response to the alert is also provided to a ticketing system 414, and such information may then be reported back to the security analyst (step 7c). The security analyst may then update the alert database (at step 8c) with the information about how the alert was handled (or otherwise closed). Thus, the alert and its associated handling information is stored in the alert database 404 and available as a data source going forward.

Figure 5:
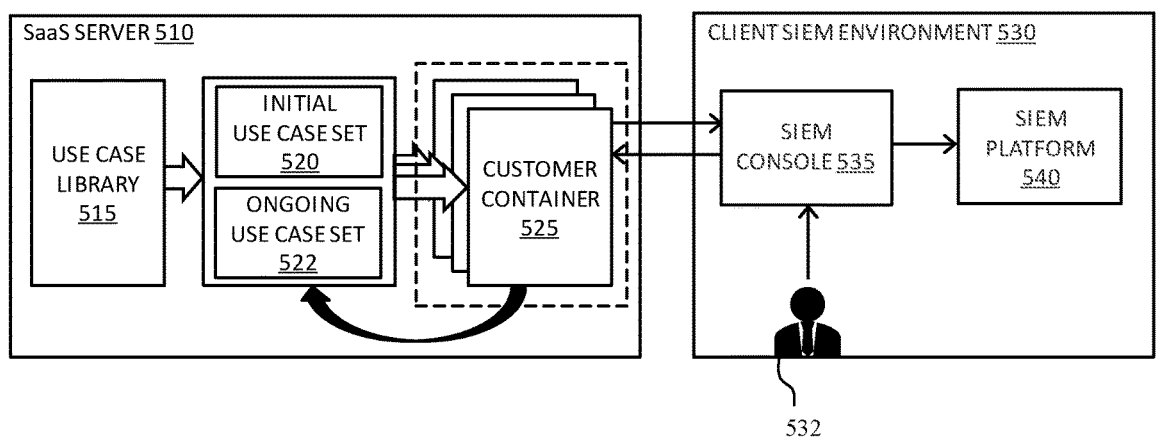
FIG. 5 depicts a block diagram of a SIEM system of server and client according to an embodiment of the disclosure, according to some embodiments.

FIG. 5 is a block diagram of a SIEM system of server 510 and client 530, according to an embodiment of the disclosure. The system provides automated recommendations of candidate use cases to a subscriber of a SIEM use case library 515. The recommendations may be tailored to the subscriber environment (e.g., client SIEM environment 530). In some embodiments, the recommendations are made using a machine learning algorithm. The recommended candidate use cases for each customer are placed in respective customer containers 525. The customer containers 525 are stored in a customer use case store shown schematically by the dotted line box. Via a SIEM console 535, the security analysts 532 responsible for managing a subscriber's SIEM environment can view their own customer container 525 in the customer container store at the use case library server 515 and select from among the candidate use cases in their container using the SIEM console's user interface (for example, within SIEM console 535) which includes suitable user controls for this purpose. The security team's selected use cases are then pushed to the SIEM platform 540 of the live client environment for deployment. The security team (for example, including security analyst(S) 532) can thus decide which of these pre-selected, candidate use cases to deploy in the subscriber's SIEM environment. The machine learning algorithm provides a computer-automated method for searching a set of use cases provided in a library to make a selection of a subset of the use cases which will be relevant to a particular environment and hence should be presented as candidates. The selected subset of candidate use cases in the customer container may be pushed to the SIEM console 535 or pulled from the SIEM console 535. Whether push or pull is used may be a configuration that is flexibly set either by the SaaS provider from the server side 510 or the customer security team from the client side 530. The automated searching of, and selection from, the library 515 by the machine learning algorithm to find use cases that are relevant to a specific environment can significantly reduce the amount of time that a security team would otherwise need to find and select relevant use cases. The machine learning algorithm can also learn from changes to the contents of the customer container over time. In some instances, the contents may be modified by the security team. Feedback of such modifications can thus be collected from the SIEM console 535 and supplied back to the machine learning algorithm.

Initially, prior to interaction with the SIEM console 535, the customer container 525 may contain only the use cases selected by the machine learning algorithm. Then, after the security team have reviewed and selected from their container, the container 525 contents are updated to reflect the selection. In some instances, deployment may require the security team to actively approve or reject every suggested candidate use case. This allows the container stored at the use case library server 515 to be updated to retain or mark as approved those use cases that have been approved for deployment by the security team, with rejected use cases being discarded or at least marked as rejected, and use cases that have neither been approved nor rejected marked as pending.

In some embodiments, the operation of the system, in respect to use case selection, can be considered in two stages, first an initial set-up of a new customer using an initial configuration module (i.e., initial use case set 520) and second ongoing refinement for an existing customer using an ongoing configuration module (i.e., ongoing use case set 522).

The automatic pre-selection (i.e., initial selection) of candidate use cases for a new customer by the machine learning algorithm may be based on comparing attributes of the new customer with corresponding attributes of existing customers. For every old or current, existing customer, there may be historic and/or current subscriber usage information. In particular, it may be known for each customer what use cases they are using, or have used, through their current and historic container contents. In some embodiments, the customer data may be sanitized (i.e., anonymized). Anonymization may be achieved by allocating a unique identification number to each subscriber. The customer attributes may be stored as metadata based on factors such as geographic location, industry sector, regulatory compliance framework, and security standards requirements. Thus, there may be a metadata store configured to store metadata for a plurality of attributes of subscribers to the SIEM system as well as which use cases the subscribers have deployed from the use case library. An initial configuration module (e.g., initial use case set 520) may employ a machine learning algorithm that can then find for a new subscriber, based on that subscriber's attributes as defined by a set of metadata, similar subscribers based on the metadata (i.e., a pair of subscribers deemed to be similar to the initial configuration module is a pair with a high degree of common attributes). The use cases selected by the similar subscribers can then be aggregated to make a personalized subscriber-specific security container for the new subscriber. The contents of the new subscriber's personalized security container may correspond to use cases selected by other subscribers deemed to be similar. For example, a page ranking algorithm may be used to make this initial selection.

In some implementations, the initial selection of candidate use cases for a new customer can be made by lookup rather than by the machine learning algorithm (e.g., based on a lookup of use cases selected by existing customers with one or more shared attributes). The machine learning algorithm can then be introduced to provide better recommendations as more data becomes available (i.e., as the system builds up a larger user base over time).

Figure 6:
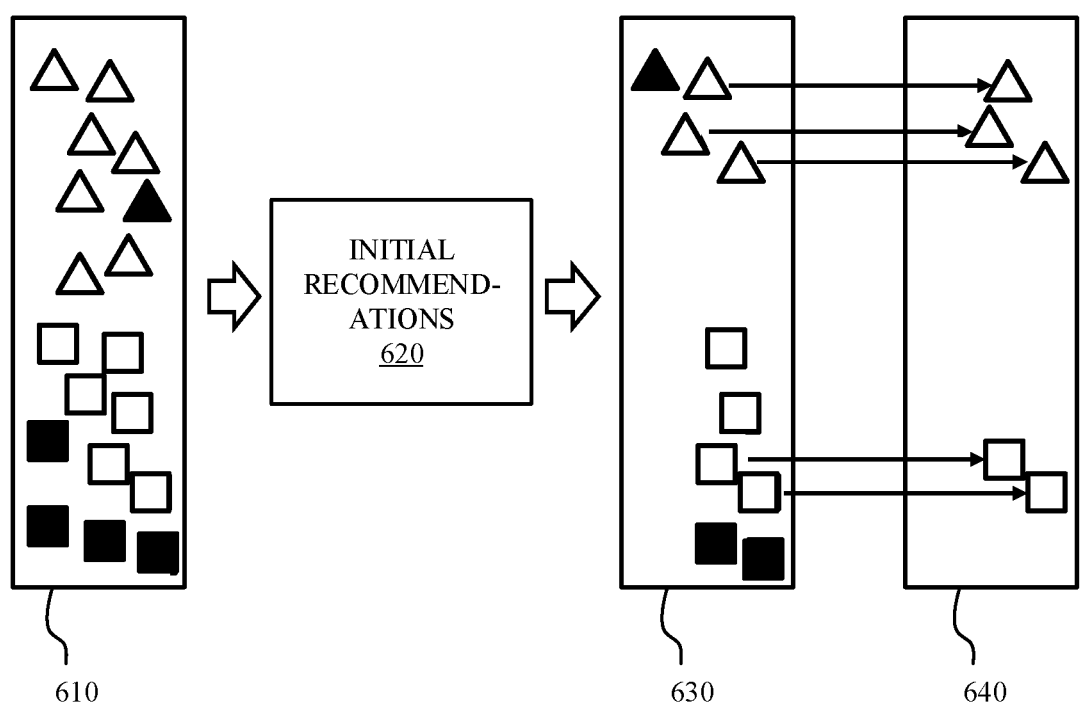
FIG. 6 depicts a schematic diagram of an example process for a new customer set-up in the SIEM system of FIG. 5, according to some embodiments.

FIG. 6 shows an example diagram for a new customer set-up with an initial configuration module. A page ranking algorithm selects from the use case library 610 a set of candidate use cases for a new customer (for example, using initial recommendations 620 from the page ranking algorithm). Different types or classes of use case are schematically depicted with triangles and squares with light or dark stippled fillings. The initial customer-specific use case recommendations are depicted at 630. From the initial, customer-specific use case recommendations 630 made by the page ranking algorithm, the security team makes a finer selection 640 using the SIEM console, this manual selection of five use cases being shown schematically with the arrows.

The normal mode of use may include that a new subscriber's personalized security container is presented to the subscriber's security team, and the security team decides which of the use cases in this container should be adopted in the SIEM environment (i.e., the security team are ultimately responsible for selecting the use cases and the contents of the container is merely a recommendation). Each recommended use case may thus be approved (or rejected) by the security team before being adopted. In some embodiments, an alternative mode of use may be one in which the recommended use cases in the subscriber's personalized security container are automatically adopted by the SIEM environment.

Figure 7:
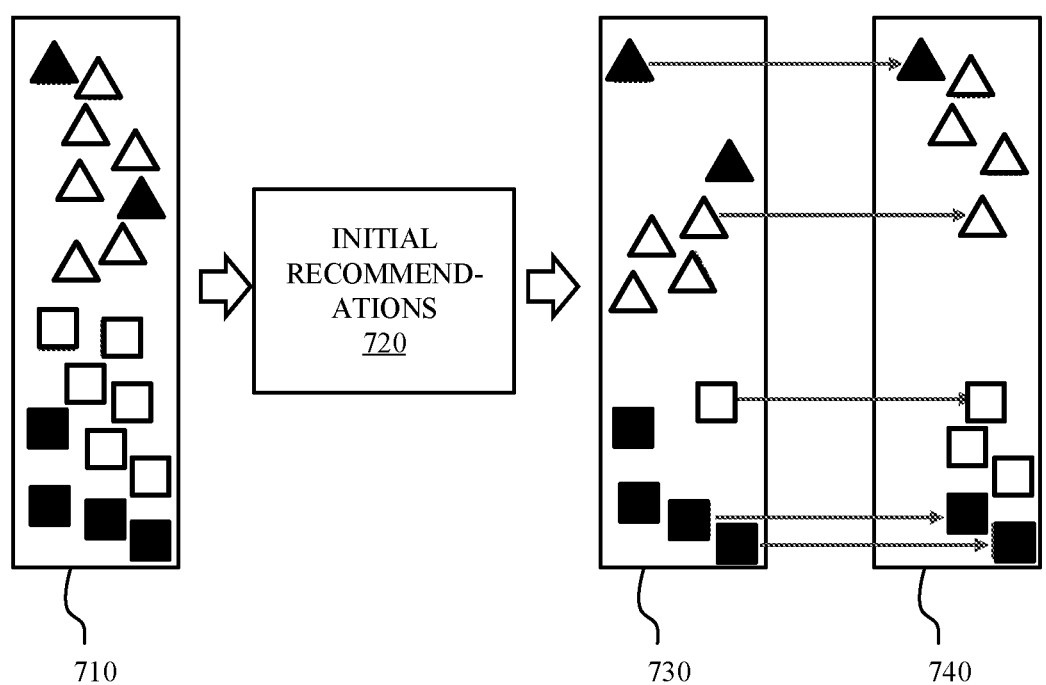
FIG. 7 depicts a schematic diagram of automatic updating of the candidate use cases by a machine learning algorithm for the client environment in the system shown in FIG. 5, according to some embodiments.

FIG. 7 shows schematically ongoing updates to the candidate use cases by the ongoing configuration module in the system shown in FIG. 5. Here the situation considered may be one in which the customer was set up some time ago and the customer desires to update the use cases that are deployed to take account of relevant changes that may have occurred since the use case selection was last made. Relevant changes may be, for example, any of the following:

changes to the SIEM environment (e.g. new hardware or software installations);

updates to the use case library 710 (e.g. new threats may have been added, or the rules for existing threats may have been changed);

manual changes made by the security team (e.g. a new use cases may have been manually selected from the library, a new use case may have been defined by the security team itself, i.e. one that was not in the library);

new log sources (e.g., firewalls, intrusion detection and prevention systems, antivirus systems, web proxies);

the fact that the customer's history will now be richer; and/or the machine learning algorithm learns from the new or supplemented set of data (e.g., including more recent history data from the customers collected since the last time the algorithm was trained).

For example, a cosine similarity algorithm may be used to make this ongoing selection of recommended use cases (customer-specific use case recommendations 730). As illustrated, the recommendations from the cosine similarity algorithm are depicted as 720, and the use case recommendations themselves are depicted as 730. Through a cosine similarity algorithm, a cosine similarity value between any given pair of existing customers may be computed based on which use cases they have deployed (and potentially also taking account of the previously mentioned customer attributes (e.g. sector, region, etc.)). For instance, the similarity values may be based on which use cases are common to the pair of subscribers. In some instances, the similarity values show how similar the pair of existing customers are (e.g., using a similarity metric). A table may be continually updated so that a full set of all such cosine similarity values is maintained. Alternatively, cosine similarity values may be computed between a given customer and other customers on demand when that customer's container is being updated. The customers for which cosine similarity values are computed may be limited to a selected subset of customers that are deemed to be similar via their attributes, in the same way as done to make the initial use case pre-selection. The candidate use cases recommended for the customer are then selected based on the use cases deployed by other customers with a cosine similarity value above a certain threshold. The updated customer selections are depicted in 740. In contrast to the initial selection of candidates, the customer container may, in some instances, only be updated cumulatively (i.e., additively) by the update, so as not to remove any use cases that are currently deployed, even if these are not recommended as candidates by the cosine similarity algorithm. The updated use case recommendations 740 may thus be transferred into the container in an additive manner, for instance in a pending state as recommendations that require approval or rejection prior to deployment. Any use case that is already deployed may not have its status changed, regardless of whether that use case is one of the updated recommendations or not, in some embodiments.

Comparing FIG. 7 with FIG. 6, the page similarity and cosine similarity algorithms have selected different sets of use cases (including some common members, but also additions and subtractions). In the illustrated examples, comparing FIG. 7 with FIG. 6, the security team has decided to approve several new use cases for deployment that were initially recommended, but rejected, as well as having approved one new use case for deployment that was not initially recommended (see arrows).

The customer containers may include a log of use case history. The use case history may not only store a history of which use cases were deployed over time but may also include which use cases have been offered for deployment and rejected either by the initial configuration module or the ongoing configuration module. The use case history may also provide a data source for the machine learning algorithm, and in particular for the cosine similarity calculation.

The subscriber's personalized security container is thus updated whenever desired. Updates may be periodic, e.g. in fixed time intervals, or on demand, e.g. triggered by a request from the subscriber's security team via the SIEM console. The update may be performed by running the cosine similarity machine learning algorithm, thereby including relevant changes more recent activity of the subscriber as well as recent updates to the set of anonymized historic subscriber usage information.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
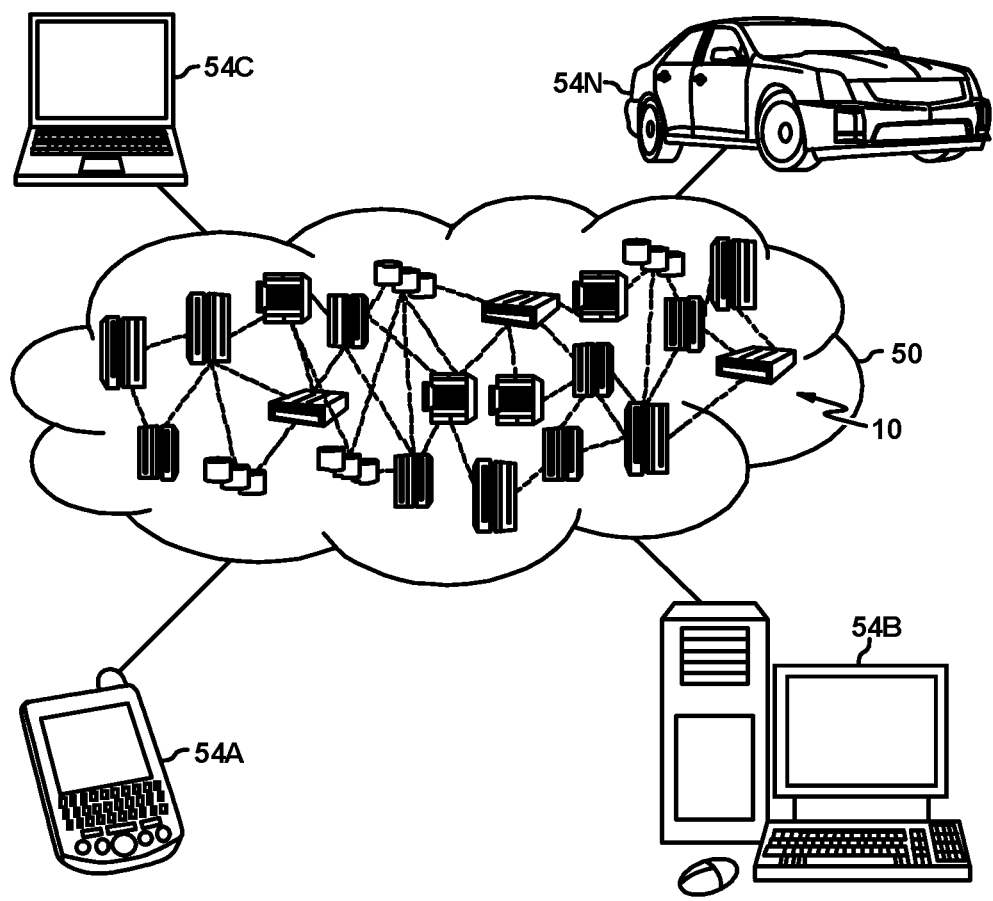
FIG. 8 depicts a cloud computing environment, according to some embodiments.

Referring now to FIG. 8, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
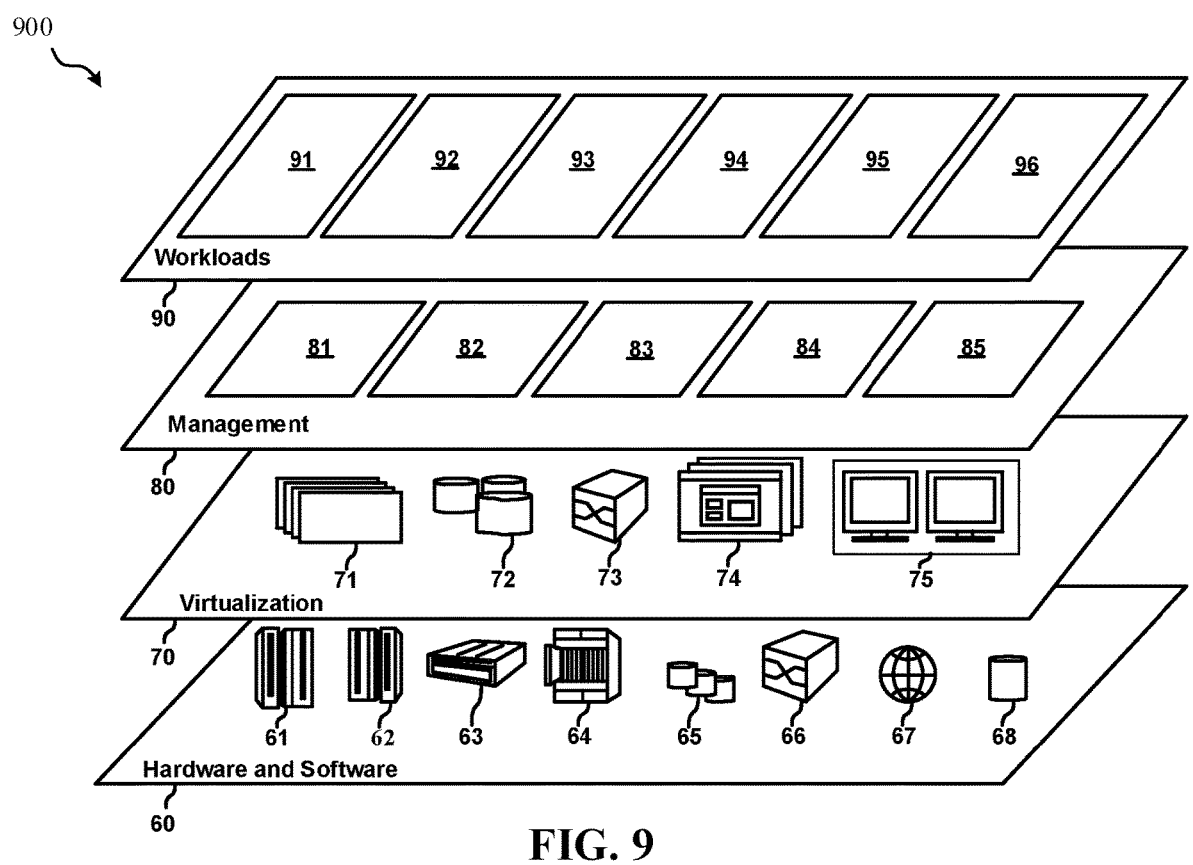
FIG. 9 depicts abstraction model layers, according to some embodiments.

Referring now to FIG. 9, a set of functional abstraction layers 900 provided by cloud computing environment 50 (FIG. 8) is shown, according to some embodiments. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and client SIEM service 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   storing a plurality of use case records in a use case repository, wherein each use case record provides a diagnostic definition of a security threat to a Security Incident and Event Management (SIEM) environment;
   storing, in a metadata store, metadata for a plurality of attributes of subscribers to the SIEM environment;
   storing use cases that the subscribers have deployed from the use case repository; and
   setting up a new subscriber, wherein setting up the new subscriber comprises:
   receiving a set of attributes of the new subscriber;
   searching the metadata store to identify subscribers with attributes that are similar to the set of attributes; and selecting an initial set of use cases for the new subscriber based on use cases deployed by the identified subscribers and subscriber containers with a log of use case history, wherein the log of use case history includes which use cases have been offered for deployment and rejected.

2. The method of claim 1, further comprising supplying the initial set of use cases to a SIEM management user interface for the new subscriber, wherein the SIEM management user interface comprises user controls configured to allow a system administrator to approve and reject the use cases for deployment in the new subscriber's SIEM environment.

3. The method of claim 1, further comprising deploying the initial set of use cases in the SIEM environment.

4. The method of claim 1, further comprising using a page ranking algorithm to search the metadata store to identify the subscribers with common attributes.

5. The method of claim 1, wherein a subscriber use case store is used to store respective subscriber containers, each storing at least the use cases deployed by the subscriber corresponding to the use case store.

6. The method of claim 1, further comprising selecting, by a machine learning algorithm, an updated set of use cases for a particular existing subscriber.

7. The method of claim 6, wherein the selecting the updated set of use cases for a particular existing subscriber comprises:
   computing respective similarity values of a similarity metric between a pair of existing subscribers, including the particular existing subscriber and other existing subscribers, wherein the similarity metric is based on which use cases are common to the pair of subscribers; and
   selecting an updated set of use cases for the particular existing subscriber based on the use cases deployed by other subscribers with similarity values above a threshold.

8. The method of claim 6, further comprising supplying the updated set of use cases to a SIEM management user interface for the particular existing subscriber, the SIEM management user interface comprising user controls configured to allow a system administrator to approve and reject the use cases for deployment in the existing subscriber's SIEM environment.

9. A system having one or more computer processors and a memory, the system configured to:
   store a plurality of use case records in a use case repository, wherein each use case record provides a diagnostic definition of a security threat to a Security Incident and Event Management (SIEM) environment;
   store, in a metadata store, metadata for a plurality of attributes of subscribers to the SIEM environment;
   store use cases that the subscribers have deployed from the use case repository; and
   set up a new subscriber, wherein setting up the new subscriber comprises:
   receiving a set of attributes of the new subscriber;
   searching the metadata store to identify subscribers with attributes that are similar to the set of attributes; and
   selecting an initial set of use cases for the new subscriber based on use cases deployed by the identified subscribers and subscriber containers with a log of use case history, wherein the log of use case history includes which use cases have been offered for deployment and rejected.

10. The system of claim 9, wherein an initial configuration module is configured to supply the initial set of use cases to a SIEM management user interface for the new subscriber, wherein the SIEM management user interface comprises user controls configured to allow a system administrator to approve and reject the use cases for deployment in the new subscriber's SIEM environment.

11. The system of claim 9, wherein an initial configuration module is configured to deploy the initial set of use cases in the SIEM environment.

12. The system of claim 9, wherein an initial configuration module comprises a page ranking algorithm to search the metadata store to identify the subscribers with common attributes.

13. The system of claim 9, wherein a subscriber use case store is used to store respective subscriber containers, each storing at least the use cases deployed by the subscriber corresponding to the use case store.

14. The system of claim 9, further configured to:
   select, by a machine learning algorithm, an updated set of use cases for a particular existing subscriber, wherein the selecting the updated set of use cases for a particular existing subscriber comprises:
      computing respective similarity values of a similarity metric between a pair of existing subscribers, including the particular existing subscriber and other existing subscribers, wherein the similarity metric is based on which use cases are common to the pair of subscribers; and
      selecting an updated set of use cases for the particular existing subscriber based on the use cases deployed by other subscribers with similarity values above a threshold.

15. The system of claim 14, wherein an ongoing configuration module supplies the updated set of use cases to a SIEM management user interface for the particular existing subscriber, the SIEM management user interface comprising user controls configured to allow a system administrator to approve and reject the use cases for deployment in the existing subscriber's SIEM environment.

16. The system of claim 14, further configured to deploy the updated set of use cases in the subscriber SIEM environment.

17. The system of claim 14, wherein an ongoing configuration module comprises a cosine similarity algorithm for computing the similarity values between pairs of existing subscribers.

18. A computer program product comprising a computer readable storage medium having program instructions embodied therewith, the program instructions executable by a server to cause the server to perform a method, the method comprising:
   storing a plurality of use case records in a use case repository, wherein each use case record provides a diagnostic definition of a security threat to a Security Incident and Event Management (SIEM) environment;
   storing, in a metadata store, metadata for a plurality of attributes of subscribers to the SIEM environment;
   storing use cases that the subscribers have deployed from the use case repository; and
   setting up a new subscriber, wherein setting up the new subscriber comprises:
   receiving a set of attributes of the new subscriber;
   searching the metadata store to identify subscribers with attributes that are similar to the set of attributes; and
   selecting an initial set of use cases for the new subscriber based on use cases deployed by the identified subscribers and subscriber containers with a log of use case history, wherein the log of use case history includes which use cases have been offered for deployment and rejected.

* * * * *